United States Patent [19]

Jordan

[11] 4,387,867
[45] Jun. 14, 1983

[54] FLYING CRAFT

[75] Inventor: Heinz Jordan, Carinthia, Austria

[73] Assignee: Technische Gerate-u Entwicklungsgesellschaft m.b.H., Wolfnitz/Klagenfurt, Austria

[21] Appl. No.: 267,493

[22] Filed: May 27, 1981

Related U.S. Application Data

[63] Continuation-in-part of Ser. No. 956,005, Oct. 30, 1978, Pat. No. 4,273,302.

[30] Foreign Application Priority Data

| Oct. 31, 1977 [AT] | Austria | 7749/77 |
| Jun. 13, 1978 [AT] | Austria | 4309/78 |
| Jun. 13, 1978 [AT] | Austria | 4310/78 |
| Feb. 1, 1980 [AT] | Austria | 537/80 |

[51] Int. Cl.³ ............... B64C 29/00; B64C 39/06
[52] U.S. Cl. ........................ 244/12.2; 244/23 C
[58] Field of Search .............. 244/12.1–12.5, 244/23 R–23 D, 73 B, 73 C, 34 A; 46/74 D, 75

[56] References Cited

U.S. PATENT DOCUMENTS

| 2,843,339 | 7/1958 | Streib | 244/12.2 |
| 3,054,578 | 9/1962 | Brocard | 244/23 C |
| 3,096,044 | 7/1963 | Gould | 244/12.2 |
| 3,456,902 | 7/1969 | Visconti | 244/23 C |
| 3,525,484 | 8/1970 | Mueller | 244/12.2 |

FOREIGN PATENT DOCUMENTS

| 1169121 | 12/1958 | France | 244/23 C |

*Primary Examiner*—Charles E. Frankfort
*Attorney, Agent, or Firm*—Beveridge, DeGrandi & Kline

[57] ABSTRACT

A flying craft has a supporting element with an opening in it. A driving unit with a propeller drives air downwardly through the opening. Vanes mounted on the driving unit break up the circular component of the air velocity and also counteract the torque on the driving unit. The downwardly moving air is formed into a laminar air stream by a second set of vanes which are connected to the supporting element for rotation therewith. The pitch of the vanes can be adjusted. Adjustment of the pitch of the second set of vanes may cause the supporting element to rotate and give the craft a gyroscopic stability. The craft is tiltable for maneuvering purposes.

5 Claims, 4 Drawing Figures

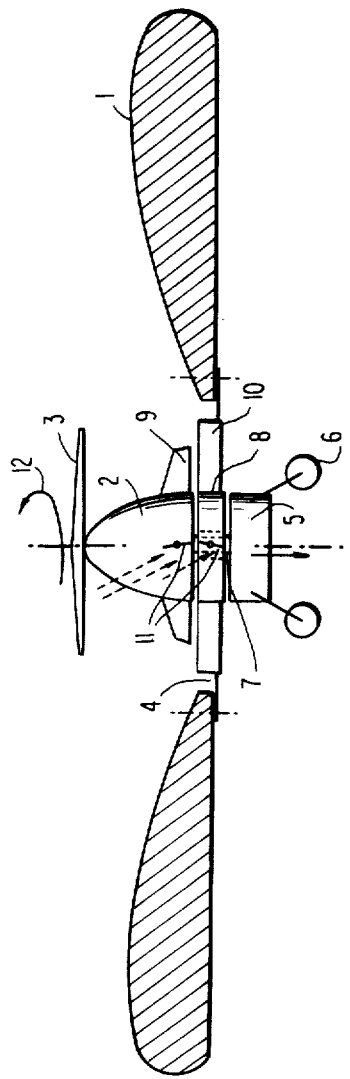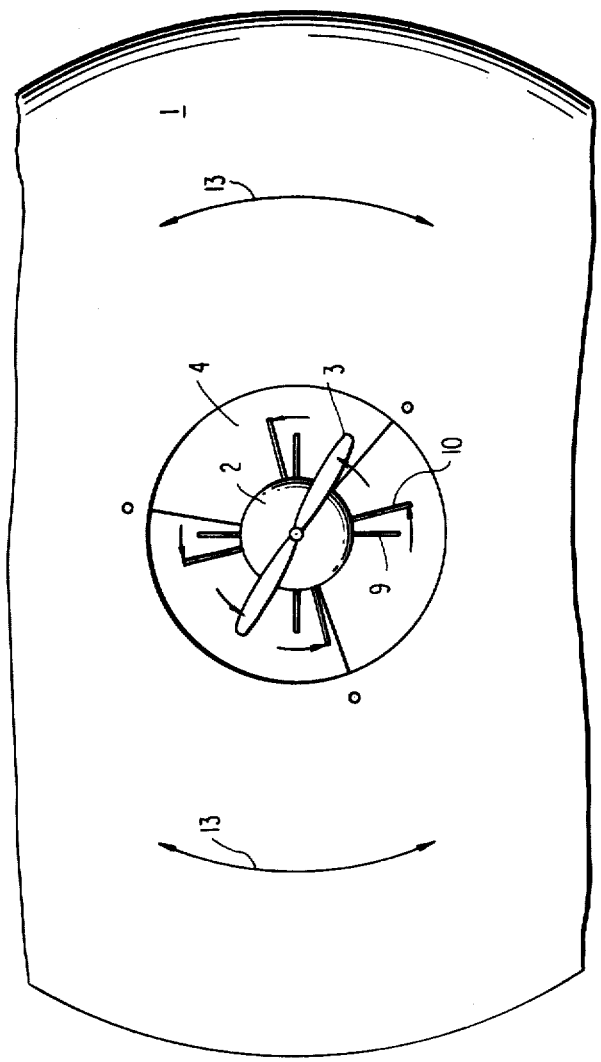
FIG.1
FIG.2

FLYING CRAFT

REFERENCE TO RELATED APPLICATION

This is a continuation-in-part of U.S. patent application Ser. No. 956,005 filed Oct. 30, 1978 now U.S. Pat. No. 4,273,302.

BACKGROUND OF THE INVENTION

The invention relates to a flying craft with an outer supporting means, at least one driving means such as a driving motor with a propeller, preferably coaxially arranged in relation to the supporting means, a carrier which may be a cabin or steering means, and an annular gap for downward movement of an air stream between the supporting means and the driving means.

A flying craft of this type is disclosed in Austrian PS No. 353,105 and U.S. patent application Ser. No. 956,005 filed Oct. 30, 1978, which are incorporated herein by reference. In such craft, the driving unit is mounted on and rotates with the supporting means, and the steering means or cabin is rotatably mounted in relation to the supporting means and the driving unit. The supporting means has the shape of an airfoil profile and, in response to the counter torque of the driving unit, it counterrotes relative to the direction of propeller rotation.

It is the object of this invention to provide an improved flying craft which has a stonger aerodynamic lift, requires reduced mechanical effort and prevents carrier rotation by a simple and effective set of vanes.

SUMMARY OF THE INVENTION

The objects of this invention are achieved in a flying craft of the type initially mentioned by providing in the annular gap, or immediately above it, at least two sets of air deflecting vanes, each set including two or more vanes which preferably are angularly adjustable, and with the sets of vanes being spatially arranged one above the other.

According to this invention, the supporting means receives its lift primarily from the air stream generated by the driving means, not by the counter torque of the driving unit. Depending upon the inclination angle of the vanes, the supporting means can be rotationally driven in the same direction of rotation as the driving unit, or in a direction counter to the rotating direction of the driving unit. It is essential that the upper set of vanes neutralize the counter torque of the air stream by defecting the air stream to align it partially and direct it downwardly. Subsequently, the air stream is formed into a substantially laminar, downwardly directed air stream by the lower set of vanes. The carrier, i.e. the load-receiving or steering means of the flying craft, does not rotate during flight.

According to an embodiment of the invention, the vanes in both sets are pivotable, preferably together, around their essentially horizontally extending axes. This provides them with an adjustable inclination which can be controlled to vary the rate of rotation of the supporting means to increase or decrease the gyroscopic effect of the supporting means, thereby influencing the stability of the flying craft.

Since the cabin of the flying craft does not rotate during flight, it is possible to connect the driving unit and the cabin rigidly to one another, in particular by means of a shaft. This results in a particularly simple and stable construction.

In a preferred construction of the flying craft, the upper set of air deflection vanes is attached only to the driving unit and the lower set of air deflection vanes is attached to both the supporting means and to a supporting plate on which the driving unit is rotatably mounted.

It is also possible to provide the supporting means with a separate additional drive which, although not absolutely necessary, improves the steering of the flying craft.

In another embodiment according to the invention, the supporting means does not carry out a rotating motion around its axis during flight. In this embodiment of the invention, the flying craft and/or the driving unit is provided with at least one means for imposing a tilting force on the flying craft as, for example, by displacing the center of gravity of the flying craft. The supporting means receives its aerodynamic lift from the air stream generated by the driving unit and not from rotation produced by counter torque from the driving unit. The supporting means can be steered by tilting, remaining stationary in air space during flight, i.e. not rotating around its axis. The upper set of steering vanes neutralizes the counter torque received by the driving unit and partially aligns the air stream and directs it downwardly, while the lower set of steering vanes subsequently generates a largely laminar, downward-directed air stream. The load-receiving cabin and/or the steering means of the flying craft do not rotate during flight.

In this latter embodiment, the means for imposing a tilting force may be a gyroscopic means rotatably mounted in relation to the driving unit, it may comprise two or more steering nozzles arranged on the supporting means, or it may be means for tilting the cabin to shift the center of gravity of the craft.

BRIEF DESCRIPTION OF THE DRAWINGS

The invention will be explained in detail with reference to the drawings which show two embodiments of the invention.

FIG. 1 is a diagrammatic sectional view of a flying craft according to the invention;

FIG. 2 is a top view of the craft of FIG. 1 partially broken away;

DETAILED DESCRIPTION OF THE INVENTION

Figure 3:
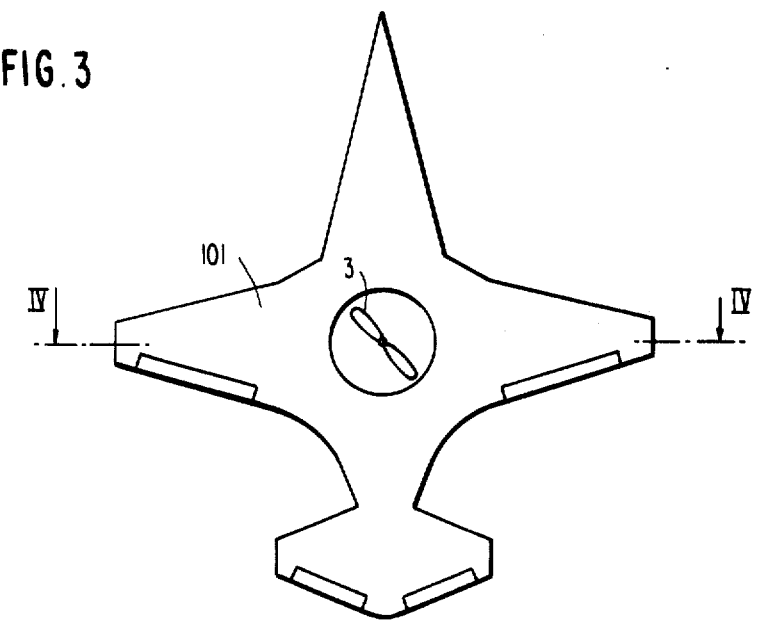
FIG. 3 is a top view of a flying craft according to another embodiment of the invention.

The flying craft illustrated in FIGS. 1 and 2 comprises a ring-shaped supporting means 1, having rotational symmetry, and a driving unit 2 with a propeller 3. As can be seen from the figures, the ring defines a normally horizontal opening which extends vertically through the supporting means 1. Propeller 3 is mounted with its axis of rotation colinear with the axis of rotational symmetry of the supporting means 1. The driving unit 2 is arranged coaxially within the supporting means 1. An annular gap 4 is formed between the supporting means 1 and the driving unit 2. The supporting means 1 viewed in cross section preferably has the form of an airfoil profile, but it may be of any other given shape. The driving unit 2 could have the form of counterrotating double propellers or of a radial-flow turbine, and it could be arranged outside axis of the supporting means 1. Connected to the driving unit 2 is a carrier which may be either a load-receiving cabin 5 having a landing gear 6, or a steering means for the flying craft. This connection between the driving unit 2 and the cabin 5 is effected by means of a shaft 7 which is perpendicular to and extends through a mounting means such as a supporting plate 8 for the driving unit 2. The supporting plate 8 is arranged below and is rotatable relative to the driving unit and forms the inner circumference in the lower part of the annular gap 4. the propeller 3 is spaced above the upper side of the supporting means 1.

A first set of air deflection vanes 9 is arranged immediately above the annular gap 4, and a second set of air deflection vanes 10 is arranged in the annular gap 4 below the first set of vanes 9. The upper set of vanes 9 is attached to the driving unit 2 only at its inner circumference, while the lower set of vanes 10 is attached to and supported by both the supporting means 1 and the supporting plate 8 for the driving unit 2. As can be seen in the figures, each set of vanes 9 and 10 includes a plurality of steering vanes, flaps, blades or baffles 11 which are pivotable around essentially horizontal axes and extend into a vertical cylindrical space which is coaxial with and radially coextensive with the annular gap 4. The vanes 11 are adjustable jointly or individually, to control their pitch, by means of an adjusting means (not shown in detail). This may be an electrically or hydraulically operated means for rotating a vane around its axis. In particular, the vanes of each set can be pivoted jointly. The upper set of vanes 9 has a smaller outer diameter than the lower set 10, but this is not essential. The dimensions may be either reversed or they may be equal. It would also be possible to use sets of vanes with unadjustable rigidly attached vanes.

The supporting plate 8 may be replaced by any other type of supporting structure such as a frame, casing or the like; and, it may rotatably support the shaft 7 by means of bearings.

The flying craft functions as follows:

Air is drawn off from the upper side of the supporting means 1 by the propeller 3 and guided downwardly toward the annular gap 4. This generates a highly turbulent, downwardly circular motion in the air. The circularly moving air stream encounters the first upper set of vanes 9 which neutralize the torque and guide the air partially downwardly. The air stream then strikes the second lower set of vanes 10. These vanes form the stream into a downwardly-directed, largely laminar air stream, which is oriented perpendicular to the supporting means. This results in very strong aerodynamic lift, as the air stream extends practically vertically. The motor or drive 2 and the cabin 5, which are fixed to one another by means of the rigid shaft 7, do not rotate. The direction of rotation of the propeller is indicated by arrow 12. The direction of rotation of the supporting means 1, indicated by arrow 13, can be in the same or opposite direction as the propeller, depending on the angular position of the vanes 11 in set 10.

The vanes in set 10 on the supporting plate 8 and the supporting means 1 allow a variation of the number of revolutions of the supporting means 1. An increase of the gyroscopic effect can be achieved by increasing the number of revolutions of the supporting means 1, thereby enhancing the stability of the craft.

During flight, the cabin 5 including the steering means does not rotate. This feature is of particular importance if the device is to be used for conveying passengers.

The transmission of the steering functions is facilitated by the rigid connection of the driving unit and the cabin to the steering means by means of shaft 7.

Since the rotationally symmetrical air foil 1 is rotatably mounted on this rigid shaft, the mechanical effort is negligible.

Figure 4:
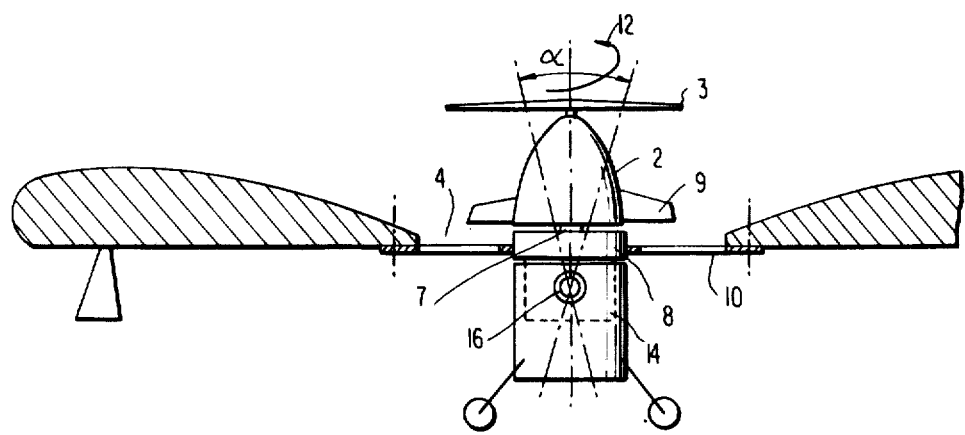
FIG. 4 is a section along line II—II of FIG. 3 in enlarged scale, partially broken away.

The flying craft illustrated in FIGS. 3 and 4 comprises in the top view an arrow-shaped supporting means 101 with air foils and a driving unit 2 with a propeller 3.

Essentially, the lift producing means of the first embodiment are used in this embodiment, including driving unit 2, propeller 3, deflection vanes 9, 10, and shaft 7. However, since the supporting means 101 in this embodiment need not be rotationally symmetrical, it may be non-rotationally connected, via plate 8 and shaft 7, to driving unit 2 and cabin 5.

Connected to the driving unit 2 is a gyroscopic means 14 for imposing a tilting force on the flying craft. In addition, steering nozzles 15 are arranged on the airfoils. These means are essentially equivalent and may optionally be employed jointly or separately. Tilting may also be produced by displacing the center of gravity by means of a pivoting device 16 which produces pivotal movement of the cabin 5 about a horizontal axis in relation to the supporting means 101, as shown in dotted lines in FIG. 4. The pivoting range is indicated by means of angle $\alpha$.

Persons familiar with the field of the invention will recognize that the invention may be utilized in a variety of flying craft other than the two embodiments disclosed herein. Therefore, it is emphasized that the invention is not limited solely to the disclosed embodiments but is embracing of variations thereto and modifications thereof which fall within the spirit of the following claims.

I claim:

1. A flying craft, comprising, an outer supporting means which has an annular airflow opening extending vertically therethrough, at least one driving means supported on the supporting means for propelling a stream of air downwardly through the opening, a carrier supported by the supporting means, an upper set and a lower set of air deflecting vanes, each set of vanes having at least two adjustable pitch vanes, said sets of vanes being spaced apart and located in the stream of air produced by the driving means, and a supporting member, said driving means being mounted on the supporting member, said upper set of vanes being fixed only to the driving means, said lower set of vanes each having one end attached to the supporting means and one end attached to the supporting member, said supporting member being rotatably mounted relative to the driving means.

2. A flying craft according to claim 1, wherein the vanes in each set are pivotable about substantially horizontal axes.

3. A flying craft according to claim 1 or 2, having a shaft which fixes together the driving means and the carrier.

4. A flying craft according to claim 1 or claim 2 wherein the upper set of vanes has a smaller diameter than the lower set of vanes.

5. A flying craft according to claim 1 having means for tilting the craft, said tilting means comprising two or more steering nozzles which are arranged on the supporting means.

* * * * *